United States Patent [19]

Smith, II et al.

[11] 4,070,217
[45] Jan. 24, 1978

[54] METHOD OF MAKING ELECTRIC BLANKET SHELL

[75] Inventors: Alexander M. Smith, II; Allen H. Adkins; Thomas M. Roth, all of Elkin, N.C.

[73] Assignee: The Fiberwoven Corporation, Elkin, N.C.

[21] Appl. No.: 658,072

[22] Filed: Feb. 13, 1976

Related U.S. Application Data

[62] Division of Ser. No. 541,645, Jan. 16, 1975, Pat. No. 3,973,066.

[51] Int. Cl.² .................. B32B 5/06; B32B 31/16; B32B 31/28
[52] U.S. Cl. .................. 156/73.2; 156/148; 156/290; 156/306; 156/309; 428/91; 428/198; 428/300; 219/212
[58] Field of Search .............. 156/73.2, 148, 166, 156/176, 178, 272, 279, 283, 290, 306, 309; 219/212, 528, 529, 549; 28/72.2 R; 428/91, 95, 105, 114, 175, 198, 239, 247, 252, 255, 284, 286, 287, 288, 294, 295, 296, 300, 301

[56] References Cited

U.S. PATENT DOCUMENTS

| | | | |
|---|---|---|---|
| 3,214,819 | 11/1965 | Guerin | 156/148 |
| 3,324,609 | 6/1967 | Stein et al. | 156/148 |
| 3,336,173 | 8/1967 | Renfroe | 156/148 |
| 3,548,147 | 12/1970 | Owers | 219/212 |
| 3,649,429 | 3/1972 | Hughes | 156/148 |
| 3,924,040 | 12/1975 | Addie et al. | 156/148 |

*Primary Examiner*—Caleb Weston
*Attorney, Agent, or Firm*—Cushman, Darby & Cushman

[57] ABSTRACT

An electric blanket shell is composed of first and second-needled textile fabrics with a yarn layer disposed in at least one of the needled fabrics. The yarn layer has a plurality of first planar yarns extending generally in a first planar direction. A heat-fusible component is disposed in at least one of the needled fabrics. A plurality of small, discrete sonically or ultra-sonically-produced fusion bonds, spaced from each other, link the needled fabrics to form a blanket shell. The fusion bonds form a series of patterns across a planar dimension of the blanket shell and the patterns define a series of channels, for receiving heating wires, between the needled fabrics. The patterns of fusion bonds are disposed in a direction traverse to the direction of the first planar yarns. The fusion bonds of any one pattern do not engage more than about 50% of the first planar yarns and overlaps of fusion-bond patterns are substantially avoided.

11 Claims, 6 Drawing Figures

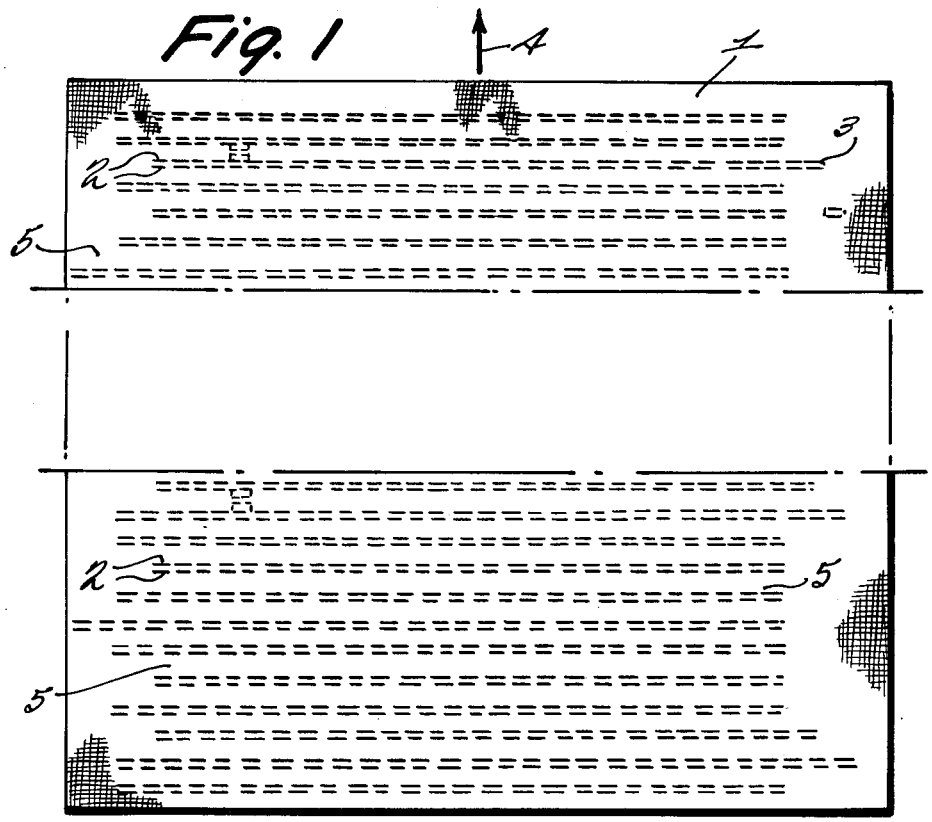
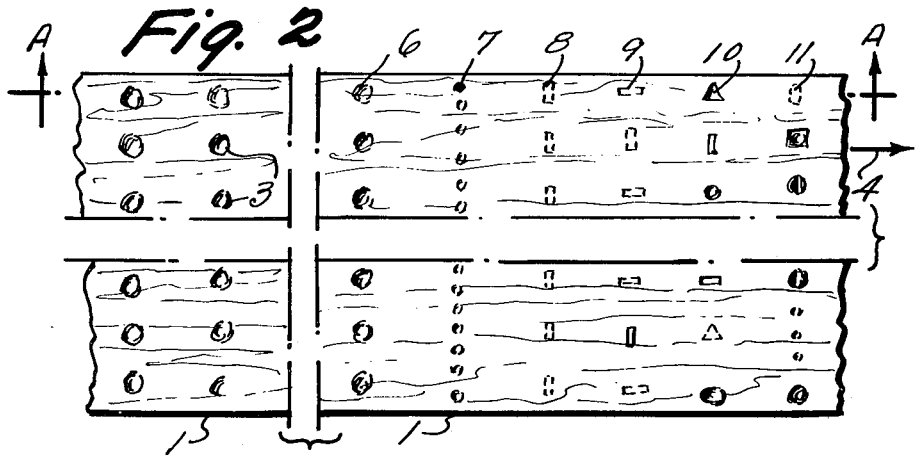

METHOD OF MAKING ELECTRIC BLANKET SHELL

This is a division of application Ser. No. 541,645 filed Jan. 16, 1975 now U.S. Pat. No. 3,973,066.

The present invention is concerned with electric blanket shells which are produced from needled textile fabrics.

BACKGROUND OF THE INVENTION

Electric blanket shells must have spaced channels between the shell fabrics to receive electrical heating wires. These channels position the electrical heating wires and, accordingly, must be uniformly disposed across the length and width of the blanket shell (except at the top, bottom and sides thereof) in order to produce a uniform heating effect. On the other hand, the channels must prevent contact of adjacent wires or even close proximity thereof, since dangerous localized overheating may otherwise occur. Thus, the shell fabrics must be joined in an accurate and positive manner.

Woven blanket shells might be produced by weaving shell fabrics and sewing the fabrics halves together with conventional thread sewing to form these channels, but this technique would involve considerable hand labor to accurately sew the channels and insure continuous, unbroken stitching. Such a technique has never been economical. The conventional technique of forming the channels for electric blanket shells is by a special weaving technique. In effect, the two shell fabrics are woven at one time on a single loom with a pattern of common warp yarns which join or lash the two shell fabrics at spaced intervals to form the channels. While this technique provides a very predictable pattern of channels and is most positive in joining the shell fabrics, it does involve the relatively slow weaving process.

Needled blankets (i.e., non-woven) have the essential strength and wear characteristics of woven blankets, and the needling technique can produce blankets at rates of 30 to 50 times faster than the weaving process. However, the needling technique cannot form channels, as can the special weaving technique. Thus, if electric blanket shells are made of needled fabrics, the needled fabrics must be joined so as to form channels with accuracy and positiveness for the same reasons noted above. Also, the practical thickness of conventional needled fabrics is greater than that of woven fabrics and the resulting total thickness of a needled fabric blanket shell is too great for comfort in use. In view of the foregoing, needled fabrics have not been practical for producing electric blanket shells.

In view of the much greater production speed of needled fabrics, it would, of course, be most desirable to provide means of accurately and positively joining needled fabrics to produce channels for an electric blanket shell. In this regard, it is known that non-woven fabrics may be joined by adhesion bonding, i.e., the application of glues, or by fusion bonding, i.e., the application of heat as by hot gas, flame and conduction (e.g., a heated iron). Fusion bonding considerably reduces the strength and fibrous nature of the fabric in the vicinity of the fusion bond, and while adhesion bonding preserves the strength and fibrous nature of the fabric, the practical problems of handling glues make it difficult to accurately, predictably and positively join such fabrics An alternative means of heating to cause fusion bonding is broadly known as vibrational heating. This technique involves the creation of a relatively high frequency vibration in a driver and this vibration is directed by a horn in physical association with the driver to localized parts of the substrate to be heated. A rigid element, called an anvil, is disposed on the opposite side of the substrate and vibrations induced in the substrate cause frictional heating. This vibrational energy can be in either the sonic or ultra-sonic frequency ranges. The technique has the advantage that the heat produced can be closely controlled and can produce predictable an localized heating. Vibrational heating has been used to weld thermoplastic sheets together. Localized heating of the sheets of thermoplastic along a narrow, relatively continuous band causes the thermoplastic sheets to be melted and then resolidified together.

This process works well with relatively high density, homogeneous, solid substrates, such as plastic sheets, because the welded (melted and resolidified) substrates are essentially the same as unwelded substrates in regard to the character and properties. However, with relatively low density, non-homogeneous substrates, such as textile fabrics, the process presents serious problems. A textile is considered to be non-homogeneous and relatively low density material in that it contains a large percent of voids between fibers.

It can be appreciated that a textile derives much of its character and physical properties from the spatial configuration of the fabrics and the interaction between fibers, while a plastic sheet derives much of its character and physical properties simply from the mass of the plastic therein. Thus, contrary to welding plastic sheets, any melting of fibers in a textile fabric tends to severely reduce the basic character and physical properties of fibers adjacent to a fusion bond. Nevertheless, vibrational heating has been used to bond textile fabrics and this technique has been referred to as sonic or ultra-sonic sewing or seaming, although the method really involves fusion bonding. Conventional apparatus and methods of such sewing and seaming are illustrated in U.S. Pat. Nos. 3,666,599, issued May 30, 1972, and 3,734,805, issued May 22, 1973. The technique can also be used for placing patterns on textile materials, and U.S. Pat. No. 3,733,238, issued on May, 15, 1973, is representative of that art. Since this art is well known, the details of the apparatus and the methods will not be repeated herein and the aforenoted U.S. patents are incorporated herein by reference and relied upon for those known details.

As noted above, the localized heating produced by the vibrational energy causes fusion of the fibers of the textile fabric and this fusion action alters the molecular structure of the fibers and therefore degrades the physical properties and character of the fibers in and adjacent to the fusion area. Under the circumstances, localized weakening of the bonded fabric takes place in and around fusion bonds. When a pattern of such fusion bonds exists across a dimension of a bonded fabric, then that pattern will tend to form a corresponding pattern of weakened areas. More specifically, a pattern of fusion bonds may define a weakened line or "tear-line" in the plane of the fabric. In woven textile fabrics, this undesired "tear-line" effect is somewhat mitigated by the very nature of the woven fabric itself. Thus, the tight, twisted arrangement of fibers within the yarns making up a woven fabric produces an extremely high degree of interfiber friction. Additionally, the systematic arrangement of these twisted yarns making up the warp and filling of the woven fabric, along with the interfiber friction of the twisted yarns, produces a very high degree of fabric integrity. This high degree of integrity is such that even if many of the fibers, or even yarns, are substantially degraded by the fusion bonding, the remaining interfiber friction and systematic arrangement still provide quite high fabric integrity and, correspondingly, the strength of the fabric which remains is sufficient for many purposes.

In contrast, the fiber arrangement in a needled fabric is far more random rather than systematic, i.e., as compared with the twisted and precise pattern of a woven fabric. Such arrangement is, therefore, less efficient in producing interfiber friction. The needling process results in a complex fiber entanglement which give rise to the interfiber friction of a needled fabric and if this entanglement is degraded in a bonding operation, the essential strength providing feature of the needled fabric is seriously degraded. Thus, when a pattern of fusion areas exist across a dimension of needled fabrics, then that pattern will tend to form a corresponding pattern of pronounced weakened areas and the "tear-line" effect becomes most serious. As a result of the foregoing, sonic or ultra-sonic bonding of needled textile fabrics has not been generally accepted where the bonded fabric must provide a strong joint and can not exhibit a "tear-line" effect.

It would, however, be most advantageous to provide a method of fusion bonding needled textile fabrics to form electric blanket shells wherein the foregoing difficulties are essentially obviated.

OBJECTS OF THE INVENTION

It is therefore an object of the invention to provide electric blanket shells where needled textile fabrics are fusion bonded together in such a manner as to avoid the difficulties noted above. It is yet a further object to provide such electric blanket shells which allow patterns of fusion bonds across a dimension of the shell and which yet provide a high level of confidence in the bond strength of the shell and essentially avoid a "tear-line" effect. Other objects will be apparent from the following disclosure and claims.

BRIEF DESCRIPTION OF THE INVENTION

Briefly stated, the present invention is based on the discovery that needled fabrics may be vibrationally fusion bonded, e.g., sonic or ultra-sonically bonded, in such a manner that patterns of fusion bonds may extend across a dimension of the bonded fabrics and yet avoid weaknesses thereacross, wherein: (1) at least one of the needled fabrics has therein a layer of yarns (including annexed to and therebetween) with at least some of the yarns extending traversely of the pattern of fusion bonds; (2) individual fusion bonds are spaced apart and any one pattern of fusion bonds engages no more than fifty percent of the traversely extending yarns; and (3) the fusion bonds of one pattern do not substantially overlap with the fusion bonds in a closely adjacent pattern. The traversely disposed yarns will disrupt any "tear-line" or "tear-strip" effect and avoid the weakness which would otherwise develop in a pattern of fusion bonds across a dimension of the shell.

Thus, the present invention provides an electric blanket shell comprising a first and a second needled textile fabric which are disposed in juxtaposition to each other and each fabric has the textile fibers needled together into an integral, coherent structure. A yarn layer is disposed in at least one of the first and second fabrics (including annexed to and therebetween) and that yarn layer has a plurality of first yarns extending generally in a planar dimension of the needled fabric. A heat fusible component is disposed in at least one of the first or the second needled fabrics (including annexed to and therebetween) and a plurality of small, discrete fusion bonds (i.e., sonic or ultra-sonic fusion bonds), spaced from each other, link the first needled fabric to the second needled fabric to form a blanket shell with a series of patterns which extend across a dimension of the blanket shell. The patterns of fusion bonds define a series of channels between the first and second needled fabrics. The patterns of fusion bonds are disposed in directions which are traverse to the direction of the first planar yarns of the yarn layer. Where the yarn layer is used in both needled fabrics, the first planar yarns of both fabrics are generally parallel to each other. The fusion bonds, however, are arranged so and spaced so that the fusion bonds of any one traversely extending pattern do not engage more than about fifty percent of the first planar yarns and so that overlaps of fusion bond patterns are substantially avoided.

Preferably both the first and second needled fabrics contain both the yarn layer and the heat fusible component. The heat fusible component may be a thermoplastic or thermosetting polymer, preferably in fibrous form. Indeed, the needled fabrics may be of only fusible fibers and all of the fibers thereof can, therefore, function as the fusible component. Alternately, of course, the needled fabrics can be made of a mixture of fibers where one of the fibers has a lower softening or melting point and therefore functions as the fusible component.

The planar yarn layer may be a self-supporting layer or not and may take various forms. Thus, the layer may be simply a series of conventional carrier yarn which will not be self-supporting or it may be a spun bonded or woven scrim or the like, which is self-supporting. In each of these latter two cases, of course, there will also be significant numbers of yarns which will extend both essentially traversely and parallel to the patterns of fusion bonds. For example, where a woven scrim is used the warp yarns thereof may form the first planar yarns and the filling will form second planar yarns which are also generally parallel to the pattern of fusion bonds. Of course, with non-woven spun bonded scrims the first planar yarns may be any of the yarns which extend generally in one dimension (or direction).

The yarns may be elongatable yarns, i.e., capable of being stretched and in the preferred embodiment of the invention, the needled fabrics with the yarn layers therein are stretched and set prior to forming the shell so as to reduce the thickness, and hence the weight per unit area, of the needled textile fabrics from which the shell is made.

Each fusion bond will generally have a planar dimension no greater than 0.75 inch, although smaller planar dimensions are preferred. In any event, there will be no substantial numbers of closely adjacent fusion bonds, in any one pattern, which overlap. This further avoids "tear-strip" effect.

According to the method of the invention, the electric blanket shell is made by needling first and second batts of textile fibers into needled fabrics having an integral coherent structure, wherein after needling at least one of the first and second needled fabrics contains the heat fusible component and at least one of the first and second fabrics contains the planar yarn layer having a plurality of first planar yarns (or the fusible component and/or yarn layer is annexed to at least one fabric or between two fabrics). The first planar yarns extend generally in a first planar dimension of the needled fabric. After these first and second fabrics are placed in layered juxtaposition (one laid on top of the other), a plurality of small discrete fusion bonds, spaced from each other, are formed so as to link the first fabric to the second needled fabric. These fusion bonds form at least one pattern of bonds which extends across a dimension of the blanket shell but wherein the patterns of fusion bonds do not engage more than 50 percent of the said first planar yarns which traverse the pattern of fusion bonds. The fusion bonds are also disposed traversely across the first planar yarns so that overlaps of fusion bond patterns are substantially avoided. Normally, the fusion bonds are formed by moving the combination of the first and second needled fabrics with the fusible component and planar yarn layer past a bonding station (sonic or ultra-sonic) which successively forms bonds in the pre-set pattern.

BRIEF DESCRIPTION OF THE DRAWINGS

In the drawings:

FIG. 1 shows a typical pattern of fusion bonds and resulting channels for an electric blanket shell.

FIG. 2 is a fragmented top view of a shell which is fusion bonded with patterns of fusion bonds extending transversely across the composite.

DETAILED DESCRIPTION OF THE DRAWINGS

Figure 3:
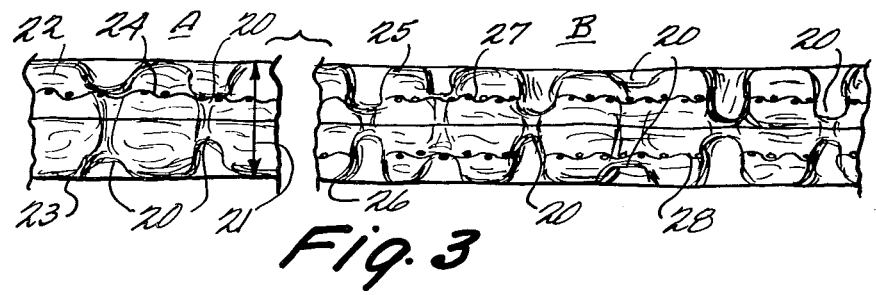
FIG. 3 is a diagrammatic illustration of a cross-section of the shell of FIG. 2, the cross-section being taken along A/A of FIG. 2.

In FIGS. 1 and 2, the shell 1 has a pattern 2 of fusion bonds 3. The longitudinal direction 4 will usually be in the machine direction of the needled fabrics used in forming the shell. The fusion bonds 3 are shown as dashes in FIG. 1 and as circular dots in FIG. 2. However, the particular pattern 2 is not narrowly critical and the pattern of the fusion bonds may take many and varied forms. FIG. 1 is representative of a suitable form which electric wire channels 5 between patterns of fusion bonds. Also, the configuration of the fusion bonds or the shape of the pattern of bonds may vary widely, as illustrated by patterns 6 through 11 of FIG. 2. Thus, the fusion bonds may be relatively large but further spaced apart, as shown in pattern 6 or relatively small and more closely spaced, as shown in pattern 7. Alternately, the fusion bonds may be elongated in a transverse direction as shown by pattern 8 or in the longitudinal direction, wholly or in part, as shown in pattern 9. Or the fusion bonds may vary within a pattern or within a combination of patterns as shown by patterns 10 and 11.

As shown in FIG. 3, the fusion bonds 20 pass through the thickness 21 to link together the first needled fabric 22 to the second needled fabric 23. Only one of the fabrics i.e., fabric 22 may have the yarn layer 24 therein, as shown on the A portion of FIG. 3, or both fabrics 25 and 26 may have the yarn layers 27 and 28, respectively, as shown in the B portion of FIG. 3 therein. This latter embodiment is the preferred embodiment. Alternately, the yarn layer may be annexed to an already formed needled fabric, e.g., by lightly glueing, stitching, bonding, etc. or simply laid between two already formed needled fabrics. Or the needled fabrics may be needled from a web of fibers laid on the yarn layer in such a manner that the yarn layer is not needled into the needled fabric. These latter embodiments, however, are not preferred. Nevertheless, for purposes of the present specification and claims the term "disposed in," with regard to the yarn layer and needled fabric is defined to include the yarn layer annexed to a needled fabric or laid between needled fabrics.

Figure 4:
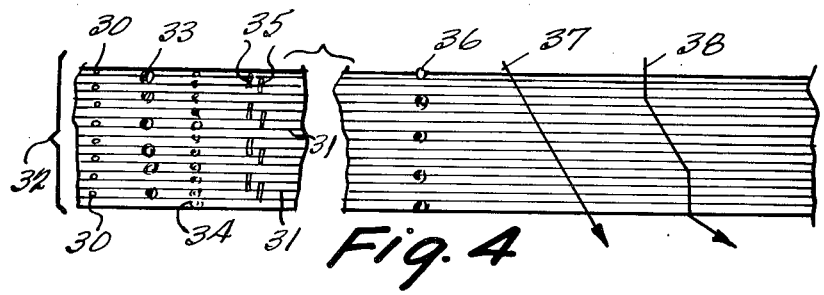
FIG. 4 is a highly idealized diagrammatic illustration of patterns of fusion bonds which engage longitudinally extending spun yarns within the shell.

In the highly idealized illustration of FIG. 4, it is shown that the fusion bonds 30 should not engage more than 50 percent of the planar yarns 31 which traverse the pattern 32 of fusion bonds. Thus, the pattern of fusion bonds 33 would engage too may planar yarns and would, thus, not be acceptable for the present invention. Even smaller bonds but too closely spaced, such as fusion bonds 34, will engage too many planar yarns and would not be satisfactory for the present invention. Alternately, even though the fusion bonds are spaced apart, if substantial number of fusion bonds in any one pattern overlap too many closely adjacent fusion bonds, as bonds 35, then too many yarns would be engaged by closely adjacent fusion bonds in a pattern and will not be acceptable for the invention. The pattern of fusion bonds 36 is representative of a preferred pattern and relative proportion of fusion bonds.

Of course, the fusion bonds need not traverse the pattern of fusion bonds in only a perpendicular or transverse direction but the bonds may traverse the pattern of bonds in an oblique manner, as illustrated by arrow 37 or even in a zig-zag or in a sinuous or other similar pattern, as illustrated by arrow 38.

As noted above, in an electric blanket shell, if the total shell thickness is too great, then the blanket will be unduly warm for the user even without the use of the electrical resistance wires for additional heating. Thus, if the individual needled fabrics are relatively thick, then when made into a layered shell, the total shell will be too thick for comfort of the user. It is, however, extremely difficult to make needled textile fabrics such that the thickness of two layers thereof is within acceptable ranges for electric blanket use. According to another important feature of the present invention, therefore, at least one of the needled textile fabrics is longitudinally stretched, prior to being formed into the shell, to reduce the thickness thereof. When the planar yarns are in the needled fabrics to be stretched, the planar yarns will also have to be stretched when stretching in the said first dimension of the needled fabric. Thus, for stretching of this embodiment the planar yarns in the first needled fabric dimension must be elongatable, that is, they must be permanently elongatable under tension, with or without heat or solvent action, e.g. steaming, etc., during the stretching operation.

Figure 5:
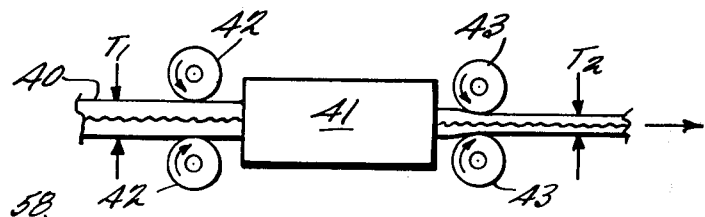
FIG. 5 is a diagrammatic illustration of apparatus for stretching needled textile fabrics from which the present shells are made.

Suitably, the stretching can be accomplished in a conventional apparatus as diagrammatically illustrated in FIG. 5 where the needled textile fabric 40 passes through a heated chamber 41 and is stretched between the set of nip rolls 42 and the set of nip rolls 43. This stretching reduces the thickness from $T_1$ to $T_2$. The unit elongation between the sets nip rolls 42 and 43 is generally at least 10% and usually at least 15–25%. Unit elongations up to 50% may be used.

The stretching operation is not critical in terms of the specific details and conditions. Thus, any of the known and generally practiced stretching methods and conditions may be used. However, if heat is used in stretching then the temperature of the needled fabric should not exceed the melting point of any component therein, since it is not desired that the needled fabric be in any way fused at this stage of the process. Suitable stretching apparatus, processes and techniques are fully described in U.S. Pat. No. 3,154,462, which is incorporated herein by reference.

Figure 6:
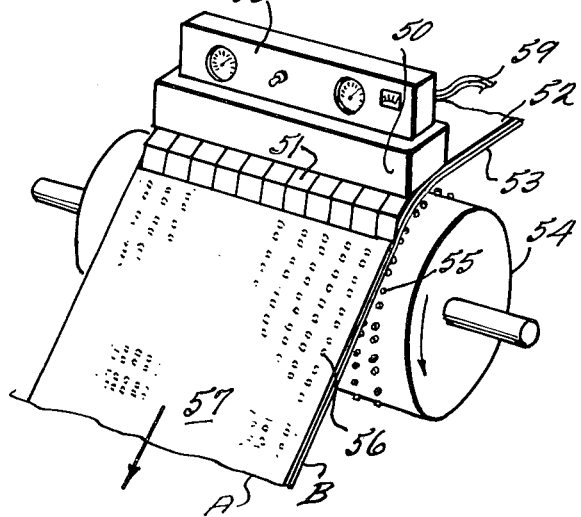
FIG. 6 is a diagrammatic illustration of apparatus suitable for producing fusion bonds in the present shell.

The pattern of fusion bonds may be made by an apparatus as illustrated in FIG. 6. This figure illustrates the use of either sonic or ultra-sonic energy for accomplishing the fusion bonding. Irrespective of the frequencies, e.g., sonic or ultra-sonic, energy is produced by way of a conventional driver 50 and directed to the fabric by way of a conventional horn 51. The layers of needled fabric 52 and 53 pass between horn 51 and a driven roll 54. Carried on that roll is a series of projections 55 which form conventional anvils (normal gaps between the horn and the anvil are in the range of 0.001 to 0.01 inch), as well understood in the sonic and ultra-sonic welding art. These projections are in the same pattern as that desired for the fusion bonds 56 to produce blanket shell 57. Of course, the apparatus will have associated therewith conventional controls 58 and a suitable power supply 59 (allowing frequencies of between 12K Hertz and 40K Hertz). The details of apparatus of the foregoing nature are well known in the art and the aforementioned U.S. patents provide those details.

While the invention can be satisfactorily practiced with no more than about 50 percent of the yarns being engaged by fusion bonds, it is preferable that no more than about 40 percent, e.g., no more than about 30 percent, of the yarns traversing the pattern of fusion bonds be engaged by the fusion bonds. Of course, if the yarns have a melting point substantially higher than the fusible component in the needled fabric, then the fusion bonding may be accomplished at lower temperatures and, accordingly, have less deleterious effect on the yarns. In this case, the proportion of yarns which may be engaged by the fusion bonds and yet produce satisfactory results will be toward the upper limit of the foregoing range. On the other hand, when the yarns have melting points close to the melting points of the fusion component, then the lower portion of the foregoing range is preferred.

As noted above, it is preferred that both the first and second needled fabrics contain the heat fusible component. This insures good fusion bonding throughout. However, similar to the planar yarn layer the fusible component may be annexed to a needled fabric or laid between needled fabrics and it is likewise intended that the specification and claims be so defined and construed. The fusible component may be either a thermoplastic or a thermosetting polymer. In this latter regard, a catalyst or activating agent will normally be required to cause the fusion bonding of the thermosetting polymer. For example, some of the fibers in the composite may have a thin coating of a "b"-stage catalyzed epoxy resin and by the application of heat, the "b"-stage resin is cured to the "a"-stage resin and thus forms the fusion bond. Whether the fusible component is thermoplastic or thermosetting, it is preferably in fibrous form. That is to say, that the fusible component will either be a homogeneous fiber itself or will be associated with a fiber. For example, the fusible component may be one of the discrete components of a multi-component fiber. One component of a fiber may be a strength providing component, such as a nylon fiber, while the other component may be a lower melting point fusible component such as a polyvinyl chloride. Alternately, such a multi-component fiber may have a coating of the fusible component on the fiber and thus form concentric components. In this case, of course, the fusible component is the outermost component. Of course, the fusible component may be on a bi- or tri- or multi-component fiber and other components may be used for the desired properties thereof.

However, it is preferable that the fusible component is in the form of a homogeneous fiber, for the sake of simplicity and predictability of operation. The homogeneous fiber may make up the entire fiber content of one or both of the needled fabrics or it may be in admixture with fibers of different compositions which have different melting points and do not enter into the fusion bonding process. In a simple case, all of the fibers of both needled fabrics may be of the same composition and form the fusion component under the action of the heat induced by the sonic or ultrasonic generator.

As can be appreciated from the foregoing, it is necessary to cause fusion of fibers, that is, at least some welding or melting together of the fibers. The fusion point is that temperature at which the fibers become sufficiently tacky to coalesce or flow together when in juxtaposition to one another. The fusion point, however, is not critical and may vary widely. The fusion point may be from as low as 180° F. to as high as 700° F., although generally fusion temperatures between 250° and 500°, especially between 300° and 475° F. are preferred.

When the fusible component is only a portion of either one or both of the needled fabrics, either as a component of the fibers or as a separate fiber, the fusible component on a weight basis, should be at least 10 percent of the weight of the shell, preferably at least 40 percent and generally at least 60 percent. This will insure that uniform and strong fusion bonds are obtained.

The materials from which the fusible component may be chosen can vary widely and are not critical. Normally, however, the fusible component will be either a thermosetting or a thermoplastic polymer.

Examples of suitable thermoplastic polymers are polymers of α-olefins, such as polyethylene, polypropylene and polybutene; vinyl polymers such as vinyl chloride, vinyl acetate, vinyl butyral, styrene, acrylonitrile; butadiene; methyl methacrylate; vinylidene chloride; polyvinyl acetate; halogenated α-olefin polymers, such as chlorinated polyethylene; halogenated vinyl chloride polymers, such as chlorinated polyvinyl chloride; condensation polymers such as linear polyesters, e.g., polyethylene terephthalate; polyamides such as polycaprolactam, polyhexamethylene adipamides; polyphenylene oxides; polycarbonates; thermoplastic oxymethylene polymers; thermoplastic linear polyurethanes; and the thermoplastic derivatives of cellulose such as cellulose acetate, cellulose butyrate and mixed cellulosic esters, for example cellulose acetate butyrate. Of course, copolymers of the foregoing may be used.

Examples of thermosetting polymers that may be used are phenol-aldehyde resins, amine-formaldehyde resins, epoxy resins, polyester resins, thermosetting polyurethanes, and vulcanizable rubbers. The thermosetting resins will normally contain a hardening agent or catalyst.

The yarns of the yarn layer may be chosen from a wide variety of materials and the particular properties thereof are not critical. The yarns may be a continuous filament (single or multi-filament), either twisted or not, or a spun yarn. It is preferred that a spun yarn be used. A "yarn" is defined as being a continuous strand composed of fibers or filaments. These yarns, running traverse to the pattern of fusion bonds will disrupt any kind of "tear-strip" effect which would otherwise be occasioned by that pattern of bonds. The yarns, therefore, are critical to the success of the invention. On the other hand, the particular materials of the yarn can be almost as desired and can be chosen from the polymers noted above or any other conventional textile yarns, including cotton, wool, flax and the like, when the needled fabrics need not be stretched. The number of yarns which traverse a pattern of fusion bonds is not narrowly critical, but preferably, there should be at least two yarns in a blanket shell for each fusion bond forming the pattern. Preferably, there will be at least three, particularly four and most suitable five to eight yarns for each fusion bond of the pattern of bonds traversing the shell. Thus, for example, there may be approximately from 5 to 50, especially 15 to 40, e.g., 30 yarns per inch of the shell dimensions traversing the pattern of fusion bonds. For example, in an 84 inch wide needled fabric, there may be from 1400 to 2800 longitudinally extending yarns. The denier of the yarns, again, is not critical and conventional deniers may be used, e.g., from 150 to 300 denier, especially from about 200 to 275 denier, e.g., 250 denier.

In order to avoid undue engagement of the yarns by the fusion bonds, the fusion bonds should be no greater than 0.75 inch in any planar dimension, especially no greater than 0.5 inch and especially no greater than an average of about 0.1 inch. By keeping the fusion bonds to these lower limits, it can be assured that no more than 50 percent of the yarns will be engaged by the fusion bonds. It should be specifically understood that the fusion bonds should be relatively uniformly spaced apart such that there are no substantial numbers of closely adjacent fusion bonds, in any one pattern of bonds, which substantially overlap other bonds in the pattern. For example, it does no good to avoid engagement of more than 50 percent of the yarns by the fusion bonds when that 50 percent is in one-half of the shell. That one-half of the shell would therefore be exceedingly weak. Neither should adjacent patterns be closely spaced. Thus, no pattern of fusion bonds should be closer to the next adjacent pattern of fusion bonds than the average distance between adjacent fusion bonds in one pattern. Thus, a substantial overlap of patterns is avoided.

The needled fabrics may be produced by any of the conventional techniques. Appropriate needling techniques are well known in the art and need not be described herein. However, U.S. Pat. Nos. 3,112,552 and 3,132,406, describe suitable needling techniques, apparatus and details and those U.S. patents are incorporated herein by reference for that purpose. Prior to the needling process, fibers are carded onto a belt and on top of the fibers the carrier yarns, scrim, etc. are placed and further fibers are carded thereonto. This web is then passed through a needling machine which unites the fibers in the needling operation and forms a fabric of consolidated needled textile fibers. The needling may be to the extent that coherent fiber entanglement occurs and especially to the extent and nature that "chain entanglement" occurs which has been explained in the above noted U.S. patents.

The amount of fibers underneath and above the yarn layer can vary considerably but it is preferred that the amount of fibers beneath the yarn layer be less than the amount of fibers above the yarn layer so that the yarn layer of the fabrics (when used in both fabrics) is nearer the center of the shell than the outer extremities thereof. In this arrangement, the innermost layers may suitably contain the majority of the fusible component and thereby cause greater bonding near the center of the shell. This arrangement will allow for a thicker top surface which may be raised in a subsequent napping operation. Quite suitably, the lower-most layer can contain substantially all of the fusible component.

A pattern of fusion bonds will form channels between an adjacent pattern of fusion bonds. These channels will terminate prior to reaching the edges of the shell and will allow for the normal electrical connections in producing a wired electric blanket from the shell. Of course, in the normal manner either one or both of the surfaces of the shell may have a napped surface.

EXAMPLE 1

Two needled fabrics were produced by needling polyester staple fibers disposed on acrylic carrier yarns. There were 1400 ends of twisted carrier yarns (of approximately 200 denier each) across the needling machine width (needle board width) of approximately 85 inches. The needling machine was a FIBERWOVEN machine according to U.S. Pat. No. 3,112,552. The needled fabric was stretched in a saturated steam box to provide a stretched fabric of about 4.5 oz. per square yard (stretched about 20% on an area basis). The two needled fabrics were laid together with the carrier yarns in each being parallel to each. A series of patterns of fusion bonds were made transversely of the carrier yarns with a Branson model 200 ultra-sonic machine. The frequency of the electrical driver was 20,000 hertz and the gap between the horn and anvil was 0.01 inch. The feed rate of the two needled fabrics through the machine was approximately 20 feet per minute. The pattern consisted mainly of sets of two parallel rows of small discrete, essentially circular, fusion bonds. The diameter of each fusion bond was approximately 0.035 inch and the center-to-center distance between fusion bonds was approximately 0.1 inch. The rows were approximately 0.15 inch apart and the distance between sets of rows, forming the channels for the electrical wires, was approximately 4 inches. The channels were well-formed and more than sufficiently strong and positive to allow safe disposition of electrical heating wires.

EXAMPLE 2

Example 1 was repeated except that: the diameter of the fusion bonds was approximately 0.1 inch; the bonds were approximately ⅜ inch apart; the rows of bonds in a set of rows were approximately ½ inch apart; and the bonds in one row of the set of rows were parallel to but staggered with respect to the bonds in the other row. Satisfactory channels were formed.

EXAMPLE 3

A bonded fabric similar to that of Example 1 was subjected to 25 serially performed but separate washings in a home washing machine using warm water and Tide detergent with tumble drying. No substantial deterioration of the fusion bonds could be detected.

Having thus described the invention and the preferred embodiments thereof, it will be apparent to those skilled in the art that the invention admits to many modifications and variations. These modifications and variations are intended to be embraced by the annexed claims.

What is claimed is:

1. A method for producing an electric blanket shell comprising:
   1. needling first and second batts of textile fibers and forming them into first and second needled fabrics each being an integral coherent structure, wherein at least one of the first or second needled fabrics contains a heat fusible component and at least one of the first and second needled fabrics contains a yarn layer having at least a first plurality of generally parallel yarns extending generally in a planar direction of the needled fabric;
   2. stretching in a planar direction of and permanently setting at least one of the first and second needled fabrics prior to forming fusion bonds linking the first and second needled fabrics;
   3. arranging the first and second needled fabrics into juxtaposition with each other;
   4. and then forming a plurality of small, discrete fusion bonds spaced from each other, which link the first needled fabric to the second needled fabric and form at least one pattern of fusion bonds which extends across one dimension of the blanket shell;
   and wherein the pattern of fusion bonds engage no more than about 50% of the said first plurality of generally parallel yarns of the yarn layer and are disposed transversely across the first plurality of generally parallel yarns of the yarn layer.

2. The method of claim 1, wherein the fusion bonds are formed by moving the combination of the first needled fabric and second needled fabric past a sonic or ultra-sonic bonding station which successively forms bonds in a present pattern.

3. The method of claim 2 wherein the sonic or ultrasonic bonding station emits energy into the combination passing next thereto and a moving surface presents a pattern of small discrete anvils next to the opposite side of the combination to form the fusion bonds.

4. A method as claimed in claim 1 wherein the stretching and setting of the at least one needled fabric are in the order of at least 10 percent up to 50 percent of the original length of the same.

5. A method as claimed in claim 4 wherein the stretching and setting of the said at least one needled fabric are usually 15 to 25 percent of the original length of the same.

6. A method as claimed in claim 1 in which the at least one needled fabric which is stretched and set includes the yarn layer and in which the stretching and setting of the one needled fabric are in the longitudinal direction of some of the yarns and the some of the yarns are stretched and set.

7. A method as claimed in claim 6 wherein stretching and setting are obtained by heating the at least one needled fabric at a temperature less than the melting point of any of the components of the said one needled fabric.

8. A method as claimed in claim 6 including stretching and setting both needled fabrics in a planar direction.

9. A method as claimed in claim 8 wherein the stretching and setting of both needled fabrics are obtained by heating at a temperature less than the melting point of any component of the first and second needled fabrics.

10. A method as claimed in claim 8 wherein the stretching and setting of the first and second needled fabrics are the same and are in the order of at least 10 percent up to 50 percent of the original length of the same.

11. A method as claimed in claim 10 wherein the stretching and setting of the first and second needled fabrics are usually 15 to 25 percent of the original length of the same.

* * * * *